July 4, 1950 — C. K. JUDD, JR — 2,513,876
GLASS CUTTER

Filed Oct. 21, 1948 — 3 Sheets-Sheet 1

INVENTOR.
CHESTER K. JUDD, JR.
BY
Louis V. Lucia
ATTORNEY

July 4, 1950 C. K. JUDD, JR 2,513,876
GLASS CUTTER
Filed Oct. 21, 1948 3 Sheets-Sheet 2
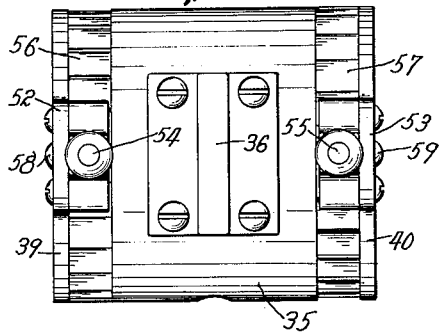
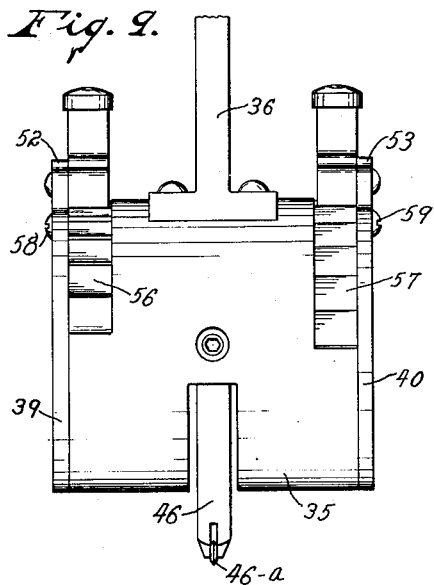
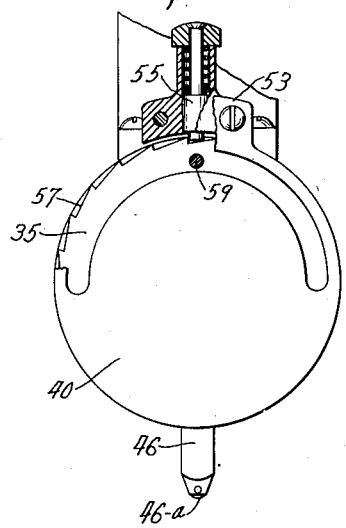
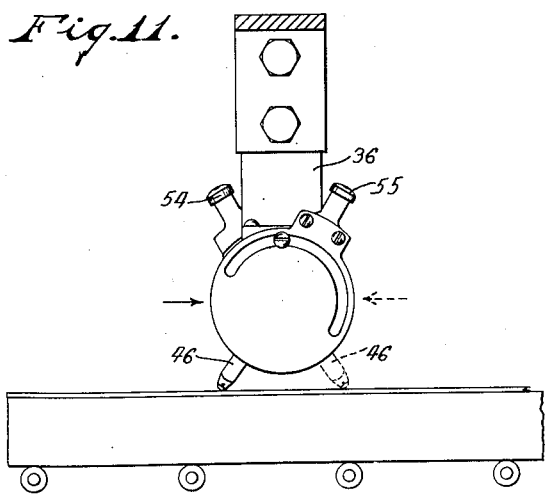
INVENTOR.
CHESTER K. JUDD, JR.
BY
Louis V. Lucia
ATTORNEY July 4, 1950  C. K. JUDD, JR  2,513,876
GLASS CUTTER
Filed Oct. 21, 1948  3 Sheets-Sheet 3
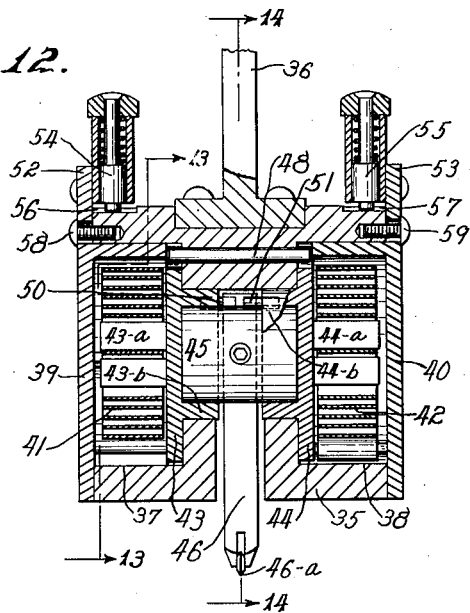
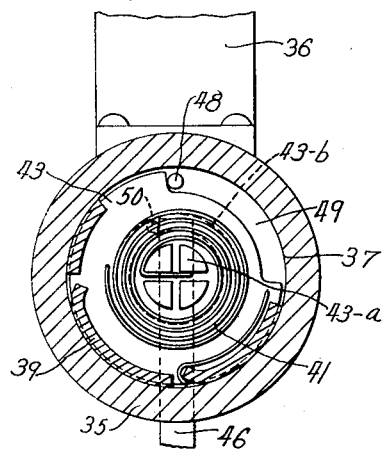
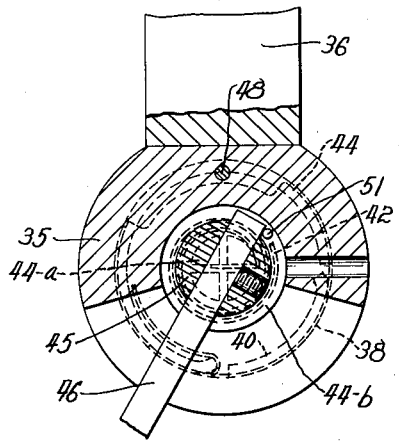
INVENTOR.
CHESTER K. JUDD, JR.
BY
Louis V. Lucia
ATTORNEY Patented July 4, 1950

2,513,876

UNITED STATES PATENT OFFICE 2,513,876

GLASS CUTTER

Chester K. Judd, Jr., Bristol, Conn., assignor to The Fletcher-Terry Company, Forestville, Conn., a corporation of Connecticut Application October 21, 1948, Serial No. 55,769

10 Claims. (Cl. 49—52)

This invention relates to glass cutters and more particularly to glass cutter heads that are adapted for use on glass cutting machines and the like.

An object of this invention is to provide a glass cutter head that is adapted for mounting in a glass cutting machine such as more fully described and shown in my co-pending application Serial No. 33,350, filed June 16, 1948.

A further object of this invention is to provide a cutter which is highly efficient in its operation, and which may be easily operated by inexperienced persons.

A still further object of this invention is to provide a head for glass cutters which is readily slidable on the slide bars of glass cutting boards, such as disclosed in the co-pending application, and which is provided with means for adjusting the tension on the cutter for best results in the cutting operations, and also with means for breaking the glass selvedge after each cutting operation.

Further objects and advantages of this invention will be more clearly understood from the following description and the accompanying drawings in which:

Fig. 8 is a plan view of a modified form of a cutter head embodying my invention.

Fig. 9 is a side view thereof.

Fig. 10 is an end view of said head with parts broken away to show the construction thereof.

Fig. 11 is an end view on a reduced scale illustrating the operation of the said head.

Fig. 12 is a side view in central vertical section.

Fig. 13 is an end view in vertical section, on line 13—13 of Fig. 12.

Fig. 14 is a similar view in central vertical section.

Figure 1:
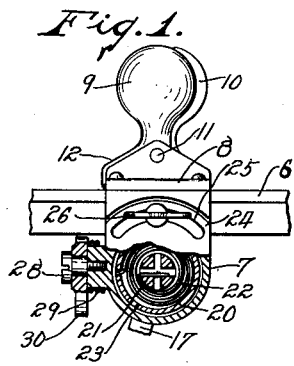
Fig. 1 is a side view, partly in section, showing a glass cutter head embodying my invention.
Figure 2:
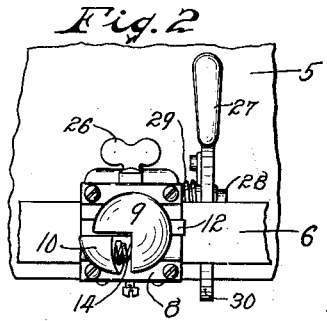
Fig. 2 is a plan view thereof and showing a portion of the board upon which it is mounted.
Figure 3:
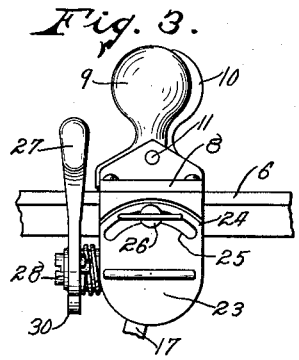
Fig. 3 is an elevational side view of the cutter head.
Figure 4:
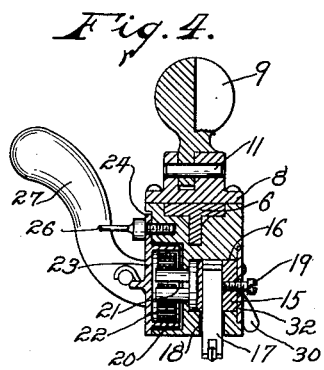
Fig. 4 is a front view of said head in central vertical section.
Figure 5:
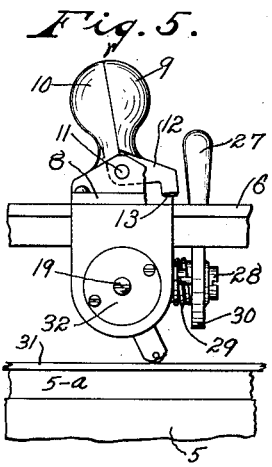
Fig. 5 is a view of the opposite side of said head and a portion of the cutter board.

As shown in the drawings, the numeral 5 denotes a glass cutting apparatus, such as the cutting board illustrated in the co-pending application above mentioned, and the numeral 6 denotes the slide bar of said apparatus which slidably carries the said glass cutting device thereon.

The present invention provides a glass cutter head comprising a body portion 7 having a groove therein to receive the said bar 6 and a cover plate 8 which slidably secures the said body to the track bar.

A handle is provided upon the plate 8 for manually sliding the said head on the slide bar for a cutting operation. The said handle is preferably constructed with a rigid portion 10 and a movable portion 9 in the form of a lever that is pivotally secured to the said plate 8 by means of a pivot pin 11. The said lever has an extension 12 which carries a brake pad 13 thereon for engaging the surface of the slide bar 6 and thereby provides for securing the head to said slide bar when the movable portion 9 of the handle is released and permitted to move under the tension of the spring 14.

An arbor 15 is rotatably mounted in a recess 16, in the body 7, and has an opening therein to receive the shank of a glass cutter 17, of conventional form, which extends through a slot 18 in the bottom of the body 7 and is secured in said opening by means of a clamping screw 19; the end of said slot providing a stop for limiting the movement of the cutter shank and retaining it in normal position.

The said arbor 15 is provided with an axial projection which extends into a recess 20 and has a slot 21 therein which receives one end of a spiral spring 22 that is contained within the recess in a case 23 which fits into the said recess 20. The opposite end of said spring is secured to the wall of said case as clearly illustrated in Fig. 1 of the drawings.

The said spring case 23 is rotatable within the opening 20, about the axes of the arbor 15, and has a projecting flange 24 thereon with a segmental slot 25 which receives a clamping screw 26 for adjustably securing the said case in different positions for varying the tension of the spring 22 as it is applied for the rotation of the arbor 15.

To provide a convenient means for breaking off a piece of glass after it has been cut by the cutter which is carried by my improved head, I provide a breaker lever 27 which is pivoted at 28 to the body 7. A spring 29 is also provided between said lever and body for yieldingly retaining the lever in its normal position wherein the breaker extension 30 thereof is raised away from the glass sheet, as indicated at 31, and out of contact therewith.

In order to retain the arbor 15 within the recess 16, there is preferably provided a cover 32 in the form of a disk which is secured to the body 7 and has a co-axial opening therein for receiving the clamping screw 19.

The operation of the above described cutter head, when mounted into a glass cutting board as shown in the above mentioned co-pending application, is as follows:

The cutter head is first moved to one end of the slide bar 6 so that it will not interfere with the positioning the the sheet of glass that is to be cut and, when the portion 10 of the handle is released, the brake pad 13 will engage the top surface of the bar 6 and retain said cutter head in position.

The glass sheet 31 is then placed upon the board 5 so that the line of the cut desired will be directly above the edge of the breaker bar 5—a which is provided as set forth in the above mentioned co-pending application.

When the glass sheet is in position for cutting, the handle portions 10 and 9 are grasped and squeezed together so that the movable portion 9 will raise the extension 12 and thereby release the tension of the cutter head from the slide bar 6.

The said cutter head is then slid on the said bar 6 to move the cutter wheel across the surface of the glass, under the tension of the spring 21, to make a line of cut in said glass directly above the supporting point of the bar 5—a.

Figure 6:
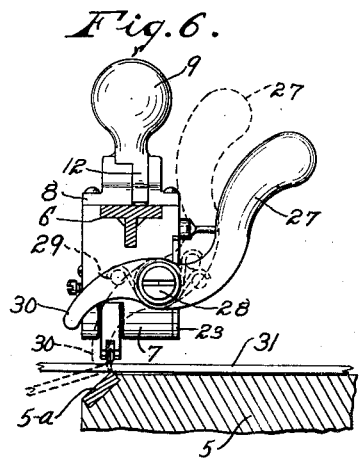
Fig. 6 is a rear view of the same, with the portion of the board being shown in section.
Figure 7:
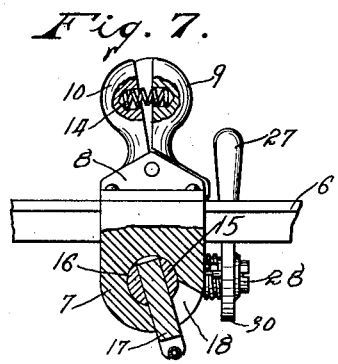
Fig. 7 is a side view similar to Fig. 5 but with parts thereof broken away to show the construction.

After the cutter wheel has been moved across the full width or length of the glass sheet 31, the breaker lever 27 is rocked upwardly, to the position shown in dotted lines in Fig. 6, so that the extension 30 thereof will engage the portion projecting out of the line of cut and break said portion off from the remainder of the sheet, on the cutter board. It will be understood that the supporting point of the bar 5—a will act as an anvil and confine the breaking of the glass directly upon the line of cut previously made by the cutter wheel.

From the above description, it will also be understood that, when it is desired to adjust the tension of the cutter wheel upon the glass, in order to obtain the best results therefrom, the said adjustment may be made by simply loosening the screw 26, turning the case 23 until the desired tension is obtained, and then re-tightening the said screw.

In the modified form illustrated in Figs. 8–14, my invention is embodied in a cutter head which is adapted to move the cutter wheel across the top of the glass sheet in two directions, so that it will not be necessary to move the cutter head to a particular end of the slide bar 6 before each cutting operation.

In the said modified form, there is provided a body portion 35 which is secured to a shank 36 that may be mounted to a suitable support, such as the slide bar 6.

The said body has recesses 37 and 38 in the opposite ends thereof to receive the casings 39 and 40 containing, respectively, the springs 41 and 42 and the discs 43 and 44 to which the said springs are attached by means of co-axial projections 43—a and 44—a thereon having slots to receive the inner ends of the respective springs; the outer ends of said springs being secured to their respective casings 39 and 40, as clearly illustrated in Fig. 13.

An arbor 45 is rotatably supported in hubs 43—b and 44—b extending from each of the discs 43 and 44 and has an opening therein to receive the shank 46 of a glass cutter having a wheel 46—a; a suitable screw being provided for clamping said shank within said opening.

A positioning pin 48 extends into the recesses 37 and 38 and also into the notches 49 in the periphery of the discs 43 and 44 so as to provide stops for normally positioning each of said discs. The hubs of the said discs are respectively provided with abutment pins 50 and 51 to engage the projecting end of the shank 46 of the glass cutter; the said pins being located at opposite sides of the said shank, as clearly illustrated in Fig. 12, to thereby normally retain the shank in a vertical position.

The cases 39 and 40 are respectively provided with extensions 52 and 53 carrying spring pressed plungers 54 and 55 adapted to engage with a series of oppositely disposed teeth 56 and 57, on the body 35, for adjusting the tension of their respective springs 41 and 42 and preventing rotation of the said casings under the tension of said springs. Clamping screws 58 and 59 are provided through slots in the said casings for securing them in adjusted position.

In the operation of the said modified form of my invention, the same may be moved across the top of a sheet of glass in either direction and it is not necessary that it be placed at one end of the supporting bar 6 previously to the glass sheet being placed upon the cutting board.

When the said head is moved, so that the wheel will engage the surface of the glass sheet, the shank 46 will swing in the direction opposite to the direction of the movement, as clearly indicated in Fig. 11. The said shank will rotate the respective disc 43 or 44, by engagement with the respective pin 50 or 51, against the tension of the respective spring so that the tension of said spring will be applied upon the cutter wheel. When the said modified form of cutter head is moved in the opposite direction, it will engage the pin 50 or 51 on the respective disc so that the tension of the spring therein will be applied to force the said cutter wheel into engagement with the surface of the glass.

It will be understood, therefore, that the springs 41 and 42 are adapted to apply pressure upon the cutter wheel in opposite directions. When the cutter wheel is moved in one direction, it will be under the tension of one of said springs and, when it is moved in the opposite direction, it will be under the tension of the other spring.

I claim:

1. A glass cutter of the character described comprising a head having a body portion with a recess therein, an arbor rotatable in said recess, a case rotatably mounted in said body portion, a spring member contained within said case having one end secured thereto and the other end secured to said arbor, a cutter including a shank mounted in said arbor, and means for adjusting said case to vary the tension of said spring.

2. In combination with a supporting bar, a glass cutter of the character described comprising a head having a body portion slidable on said bar, releasable means on said body portion normally engageable with said bar for preventing sliding movements of said body portion thereon, an arbor rotatably mounted in said body portion, a cutter shank secured in said arbor, a spring for normally rotating said arbor in one direction, stop means for limiting the movement of said arbor and shank, and adjustable means for varying the tension of said spring.

3. In combination with a supporting bar, a glass cutter of the character described comprising a body portion slidable on said bar, a handle for sliding said body portion on the bar, brake means normally engageable with said bar to prevent sliding movement of the said body portion thereon, means associated with the said handle for operating said brake means, a shank rotatably carried in said portion and having a cutter wheel at the end thereof, spring means normally urging said shank in one direction, and a breaker member pivotally carried on said body portion and having an extension movable into position for breaking a portion of a glass sheet on a line of cut made by said wheel.

4. In combination with a supporting bar, a glass cutter of the character described comprising a body portion slidably mounted on said bar, a brake member pivotally mounted on said body portion and adapted to normally engage the surface of said bar for retaining the body portion in fixed position thereon, a handle for moving said body portion on said bar, means associated with said handle for operating said brake member, a cutter wheel carried by said body portion, a breaker lever pivoted on said body portion, an extension on said lever adapted to be moved into engagement with the surface of a sheet of glass to break said glass on a line of cut made therein by said wheel, and spring means normally retaining said breaker lever in position with the said extension in retracted position relatively to said glass sheet.

5. In combination with a supporting bar, a glass cutter of the character described comprising a body portion adapted to hang downwardly from said bar and having a groove in the top thereof to receive said bar, a cover plate secured to said body portion over the top of said bar for slidably retaining the said body portion thereon, a handle on said cover plate for moving said cutter body along said bar, a brake member pivoted on said cover plate and having a portion associated with said handle for operating said brake member, a spring between said handle and said operating portion normally urging said brake member into contact with said bar to retain the cutter body in fixed position thereon and against sliding movement, a shank pivotally carried in said body portion and projecting downwardly therefrom through a slot therein; one end of said slot forming a stop for normally positioning said shank, spring means normally urging said shank in one direction and against the said stop, a cutter wheel carried at the end of said shank, means for adjusting the tension of said spring, a breaker lever pivotally carried on said body portion and having a handle portion for operating said lever, an extension on said lever adapted to engage the surface of a sheet of glass beyond a line of cut made therein by said cutter wheel and thereby break off said piece of glass along said line, and spring means normally retaining said breaker lever in retracted position relative to the said glass sheet.

6. A glass cutter of the character described comprising a head including a body portion having co-axial recesses in opposite sides thereof and a co-axial opening between said recesses and a slot communicating with said opening, a disc located in each of said recesses having a hub extending into said opening, an arbor rotatable in each of said hubs, a shank secured in said arbor and extending through the said slot in the body portion, a cutter wheel rotatable in the end of said shank, a spring member secured to each of said discs for rotating them in opposite directions, abutment means in each of said hub portions positioned on opposite sides of said shank for retaining the said shank in normal position, stop means on said body portion engageable with said discs for retaining the disc against rotation in one direction; the said abutment means on each of said hub portions also being engageable with said shank for rotating said discs against the tension of its respective spring, and separate means for adjusting the tension of each spring.

7. A glass cutter comprising a head having a body portion, a cutter shank rotatably carried in said body portion, a cutter wheel at the end of said shank, means for locating said shank in a normal position, a pair of spring members connected to said shank in opposed relationship for yieldingly resisting movement thereof in a direction away from said normal position, a casing containing each of said springs and rotatably mounted to a side of said head and secured to said spring, and ratchet means on each of said casings for adjusting each casing to vary the tension of its respective spring as applied against the movement of the shank.

8. A glass cutter comprising a body portion having a recess in opposite ends thereof, a co-axial opening extending between said recesses, a slot communicating with said opening, a casing rotatable in each of said recesses, a disc rotatable in each of said recesses and having a hub extending into its respective end of said opening and rotatable therein, an arbor rotatable within the said hubs, a shank secured in said arbor and projecting downwardly through said slot, a cutting wheel rotatably mounted in the end of said shank, a spiral spring in each of said casings having an end secured to its respective casing and its opposite end secured to a projection on the said disc for rotating the disc in one direction, means for rotatably adjusting said casings in said body portion to vary the tension of the respective springs, a pin having its opposite ends extending into said recesses for engaging an abutment on the periphery of said discs to prevent rotation thereof in one direction, an abutment on each of said hubs engageable with opposite sides of said shank for applying the tension of said springs against movement of the shank in opposite directions.

9. In a glass cutter of the character described, a body portion having a cutter shank rotatably mounted therein, means for retaining said cutter shank in a normal position in said head, spring means for applying tension at opposite sides of said shank to yieldingly resist movement thereof in either direction away from said normal position; the said spring means comprising a pair of springs each connected to said body portion and to opposite sides of said shank.

10. A glass cutting device of the character described comprising a head having a body portion with recesses in the opposite sides thereof, a disc rotatable in each of said recesses, an arbor rotatable between said discs, a cutter shank secured in said arbor and projecting downwardly therefrom on a vertical axis, a spiral spring for each of said discs adjustably secured to said body portion to resist rotation of its respective disc, an abutment for applying the tension of each of said springs against the said shank when wound to either side of the vertical axis, and stop means on said body portion engaging each of said discs to limit movement thereof in opposite directions against the tension of the respective spring for normally locating said shank on said axis.

CHESTER K. JUDD, Jr.

REFERENCES CITED

The following references are of record in the file of this patent:

FOREIGN PATENTS

| Number | Country | Date |
|---|---|---|
| 33,821 | France | Mar. 25, 1929 |
| 496,854 | Germany | Apr. 30, 1930 |